United States Patent
Metaxas et al.

(10) Patent No.: US 11,757,727 B2
(45) Date of Patent: Sep. 12, 2023

(54) SYSTEM AND TECHNIQUES FOR INTELLIGENT NETWORK DESIGN

(71) Applicant: CERTAIN SIX LIMITED, London (GB)

(72) Inventors: Alex Michael Metaxas, Banbury (GB); Riccardo Scott, London (GB); Joel Oughton, London (GB); Charis Kyriakou, Peterborough (GB); Mark Leach, Ifield (GB)

(73) Assignee: Certain Six Limited, London (GB)

( * ) Notice: Subject to any disclaimer, the term of this patent is extended or adjusted under 35 U.S.C. 154(b) by 0 days.

(21) Appl. No.: 17/434,698

(22) PCT Filed: Feb. 28, 2020

(86) PCT No.: PCT/GB2020/050484
§ 371 (c)(1),
(2) Date: Aug. 27, 2021

(87) PCT Pub. No.: WO2020/174250
PCT Pub. Date: Sep. 3, 2020

(65) Prior Publication Data
US 2022/0173978 A1  Jun. 2, 2022

Related U.S. Application Data

(60) Provisional application No. 62/812,236, filed on Feb. 28, 2019.

(51) Int. Cl.
*H04L 41/14* (2022.01)
*H04L 41/12* (2022.01)

(52) U.S. Cl.
CPC ............ *H04L 41/145* (2013.01); *H04L 41/12* (2013.01)

(58) Field of Classification Search
CPC ..... H04L 41/145; H04L 41/12; H04L 41/122; H04L 41/40; H04L 41/0806; H04L 41/0895; H04L 41/147; H04L 41/16
See application file for complete search history.

(56) References Cited

U.S. PATENT DOCUMENTS 9,590,860 B2  3/2017  Forbes et al.
10,498,609 B1 *  12/2019  Barbiro ................... H04L 41/16
(Continued)

FOREIGN PATENT DOCUMENTS

WO  WO-2015142939 A1 *  9/2015  ......... H04L 41/0803

OTHER PUBLICATIONS

Bernal, Adrian et al. "A Framework for Modeling Cloud Infrastructures and User Interactions", IEEE Access, vol. 7, Mar. 25, 2019, pp. 43269-43285.

(Continued)

*Primary Examiner* — Tonia L Dollinger
*Assistant Examiner* — Joseph M Cousins
(74) *Attorney, Agent, or Firm* — Kilpatrick Townsend & Stockton LLP

(57) ABSTRACT

A system and techniques for intelligent network design allows for capture and conversion of a basic network design, often manually created, into a digital format without duplication of effort. The disclosed techniques provide a faster, more intelligent approach for designing a network by analyzing many thousands of existing network designs and recommending proposed solutions based on user provided objectives. The techniques can generate provider independent code that provides flexibility in supporting arbitrary provider targets. The techniques can also output provider specific code that allow for rapid, efficient deployment of the network. In addition, the technique can output network system architecture designs of varying details that can be (Continued)

customized for the intended audience. The techniques provide for automated importing and updating provider changes to network components, schemas, and application programming interfaces reducing any lag in system design.

20 Claims, 14 Drawing Sheets

(56) References Cited

U.S. PATENT DOCUMENTS

| | | | |
|---|---|---|---|
| 2002/0140682 A1* | 10/2002 | Brown | G06F 3/04883 |
| | | | 345/173 |
| 2014/0313216 A1* | 10/2014 | Steingrimsson | G06V 30/32 |
| | | | 345/589 |
| 2017/0286799 A1* | 10/2017 | Gujar | G06V 10/462 |
| 2018/0114334 A1* | 4/2018 | Desai | G06K 9/6271 |
| 2018/0357152 A1* | 12/2018 | Browne | G06F 11/3664 |
| 2018/0373961 A1* | 12/2018 | Wang | G06V 30/422 |
| 2020/0089787 A1* | 3/2020 | Armenta Lopez | G06F 16/5854 |
| 2020/0244527 A1* | 7/2020 | Sharma | H04L 41/0816 |

OTHER PUBLICATIONS

PCT/GB2020/050484, International Search Report and Written Opinion dated Aug. 31, 2020, 19 pages.

\* cited by examiner

SYSTEM AND TECHNIQUES FOR INTELLIGENT NETWORK DESIGN

CROSS REFERENCE TO RELATED APPLICATIONS

This application is the U.S. National Phase application of International Application No. PCT/GB2020/050484, filed Feb. 28, 2020, which claims priority to U.S. Provisional Application No. 62/812,236, filed Feb. 28, 2019, and the contents of which is hereby incorporated by reference herein in its entirety.

FIELD

This application discloses technology related to the field of designing computer network architecture, specifically for cloud-based networks.

BACKGROUND

Designing and deploying computer systems is a complex task due, in no small part, due to the myriad of target providers (e.g., (hyperscale) cloud, on-premise data centers, software as a service (SaaS)) and devices (e.g., mobile, Internet of things (IoT), and edge). Particularly in the hyperscale cloud space (e.g., Microsoft Azure, Amazon Web Services, Google Cloud Platform), the volume of changes with respect to both new types of resources and new features for existing resources make the design, deployment, and maintenance of solutions challenging. For example, a network provider may have hundreds or even thousands of resources, each with many configuration options leading to countless combinations. To compound the problem, individuals possessing so-called cloud-native skills are a scarce resource.

A typical solution architect workflow can occur as follows: first a solution will be modelled on a whiteboard as a system architecture diagram. Next, the diagram is then converted by hand to a digital drawing with additional details added. Finally, the digital drawing will be converted to code by a skilled engineer and the solution deployed to the target providers and devices. In the traditional flow, a solution architect must go from their natural domain specific language, a system architecture diagram, to code.

Current solutions aid in only some parts of the problem. For example, generic drawing programs exist, such as Microsoft Visio, allow solution architects to produce technical drawings. However, these tools use simple stencils, offer no design assistance, and have no deployment capability. Other approaches allow designs to be constructed using code, which is required for automated deployments, but by definition create a barrier to entry for those not skilled in the authoring of code. Code based approaches also lack design assistance. Finally, provider portals are often available that allow the user to deploy resources, but these portals rarely support best practices approaches to deployment such as those espoused by the development operations (DevOps) movement (e.g., automation, reproducibility, immutability).

SUMMARY

The system and techniques for intelligent network design provide solutions to many of the shortfalls of traditional systems. The disclosed techniques for intelligent network design allow for capture and conversion of a basic network design often manually created into a digital format without the duplication of effort. The disclosed techniques provide a faster, more intelligent approach for designing a network, based on the basic network design, by analyzing many thousands of existing network designs and recommending proposed solutions based on user provided objectives. Previous solutions depended on a user searching long lists of component options using traditional mechanisms (e.g., searching and filtering.) The techniques can generate provider independent code that provides flexibility in supporting arbitrary provider targets. The techniques can also output provider specific code that allow for rapid, efficient deployment of the network. In addition, the technique can output network system architecture designs of varying details that can be customized for the intended audience. The techniques provide for automated importing and updating provider changes to network components, schemas, and application programming interfaces reducing any lag in system design. It is to be appreciated that in all aspects below, where provided dependent code is generated, the code may additionally be transmitted to a provider to initiate deployment.

In a first aspect, a computer-implemented method for designing a system architecture performed by one or more processors is disclosed. The method can include receiving an image of a diagram of a base structure of a network. The method can include extracting a position and a size of a multiple network components from the diagram to build a provider-independent code data structure. The method can include calculating a list of network design suggestions. The method can include providing the list of network design suggestions to a user. The method can include generating provider-dependent code specific to one or more user selected targets. The method of the first aspect may be adapted according to any teaching described herein, including, but not limited to any one or more of the following.

The method can include storing one or more network designs to a design database. The method can also include analyzing the one or more stored network designs to inform the list of network design suggestions. The one or more network designs may be created by the user.

Extracting the position and the size of the plurality of network components can include preprocessing the image, detecting one or more network architecture objects in the image, labelling the one or more architecture objects in the image creating an improved network model; and generating the provider-independent code data structure.

The method can further include storing the improved network model to a database; and analyzing the improved network model to train an object detector.

In various embodiments, the method can include providing a suggested label for the one or more architecture objects to the user. In various embodiments, the method can include importing static design data from one or more public sources via a network; and storing the static design data to a design database.

In various embodiments, the method can include simulating a plurality of network models using a design assistance model trainer using the static design data the provider-independent code data structure, extracting one or more features of the plurality of network models; and scoring the plurality of network models to select a recommended model.

In a second aspect, an intelligent network generation system includes one or more processors; and one or more memory devices comprising instructions that, when executed by the one or more processors, cause the one or more processors to perform operations including: receiving an image of a diagram of a base structure of a network; extracting a position and a size of a plurality of network components from the diagram to build a provider-independent code data structure; calculating a list of network design suggestions; providing the list of network design suggestions to a user; and generating provider-dependent code specific to the user selected target. The second aspect may be adapted according to any teaching described herein, including, but not limited to any one or more of the following. The second aspect may be adapted according to any of the optional features described for the other aspects.

The intelligent network generation system can include instructions that when executed by the one or more processors, cause the one or more processors to perform operations including storing one or more network designs to a design database; analyzing the one or more stored network designs to inform the list of network design suggestions.

The one or more network designs may be created by the user.

Extracting the position and the size of the plurality of network components can include preprocessing the image; detecting one or more network architecture objects in the image; labelling the one or more architecture objects in the image creating an improved network model; and generating the provider-independent code data structure.

The intelligent network generation system can further include instructions that when executed by the one or more processors, cause the one or more processors to perform operations including storing the improved network model to a database; and analyzing the improved network model to train an object detector.

The intelligent network generation system may further include instructions that when executed by the one or more processors, cause the one or more processors to perform operations comprising providing a suggested label for the one more architecture objects to the user.

The intelligent network generation system may further include instructions that when executed by the one or more processors, cause the one or more processors to perform operations including importing static design data from one or more public sources via a network; and store the static design data to a design database.

In a third aspect, a non-transitory, computer-readable medium comprising instructions that, when executed by one or more processors, cause the one or more processors to perform operations including receiving an image of a diagram of a base structure of a network; extracting a position and a size of a plurality of network components from the diagram to build a provider-independent code data structure; calculating a list of network design suggestions; providing the list of network design suggestions to a user; and generating provider-dependent code specific to one or more user selected targets. The third aspect may be adapted according to any teaching described herein, including, but not limited to any one or more of the following. The third aspect may be adapted according to any of the optional features described for the other aspects.

The non-transitory, computer-readable medium may further include instructions that, when executed by one or more processors, cause the one or more processors to perform operations including storing one or more network designs to a design database; and analyzing the one or more stored network designs to inform the list of network design suggestions.

The one or more network designs may be created by the user.

The extracting the position and the size of the plurality of network components may include preprocessing the image; detecting one or more network architecture objects in the image; labelling the one or more architecture objects in the image creating an improved network model; and generating the provider-independent code data structure.

The non-transitory, computer-readable medium may further include instructions that, when executed by one or more processors, cause the one or more processors to perform operations including storing the improved network model to a database; and analyzing the improved network model to train an object detector.

The non-transitory, computer-readable medium may further include instructions that, when executed by one or more processors, cause the one or more processors to perform operations comprising providing a suggested label for the one more architecture objects to the user.

The non-transitory, computer-readable medium may further include instructions that, when executed by one or more processors, cause the one or more processors to perform operations including importing static design data from one or more public sources via a network; and storing the static design data to a design database.

In a fourth aspect, a computer-implemented method for network design image analysis performed by one or more processors, the method includes receiving an image of a diagram of a base structure of a network; extracting a position and a size of a plurality of network components from the diagram; and generating provider independent code data structure. The fourth aspect may be adapted according to any teaching described herein, including, but not limited to any one or more of the following. The fourth aspect may be adapted according to any of the optional features described for the other aspects. The computer-implemented method may further include scanning the image of the diagram of the base structure of the network using a scanner.

The extracting may comprise recognizing one or more magnetic markers identifying network components. The extracting may comprise employing computer vision techniques to extract the position and the size of the plurality of network components.

The computer-implemented method may further include storing one or more network designs to a design database; and analyzing the one or more stored network designs to generate a list of network design suggestions. The computer-implemented method may further include preprocessing the image.

The computer-implemented method may further include detecting one or more network architecture objects in the image; and labelling the one or more architecture objects in the image thereby creating an improved network model. The labelling may be automatically performed based on said detecting.

In a fifth aspect, an intelligent network generation system includes one or more processors; and one or more memory devices comprising instructions that, when executed by the one or more processors, cause the one or more processors to perform operations including receiving an image of a diagram of a base structure of a network; extracting a position and a size of a plurality of network components from the diagram; and generating provider independent code data structure. The fifth aspect may be adapted according to any teaching described herein, including, but not limited to any one or more of the following. The fifth aspect may be adapted according to any of the optional features described for the other aspects.

The intelligent network generation system may further include a scanner for capturing the image of the diagram of the base structure of the network.

The intelligent network generation system may further include one or more markers for identifying network components.

The extracting may comprise employing computer vision techniques to extract the position and the size of the plurality of network components.

The intelligent network generation system may further include instructions that when executed by the one or more processors, cause the one or more processors to perform operations includes storing one or more network designs to a design database; and analyzing the one or more stored network designs to generate a list of network design suggestions.

The intelligent network generation system may further include instructions that when executed by the one or more processors, cause the one or more processors to perform operations including preprocessing the image.

The intelligent network generation system may further include instructions that when executed by the one or more processors, cause the one or more processors to perform operations including detecting one or more network architecture objects in the image; and labelling the one or more architecture objects in the image thereby creating an improved network model.

The labelling may be automatically performed based on said detecting.

In a sixth aspect, a non-transitory, computer-readable medium comprising instructions that, when executed by one or more processors, cause the one or more processors to perform operations including receiving an image of a diagram of a base structure of a network; extracting a position and a size of a plurality of network components from the diagram; and generating provider independent code data structure. The sixth aspect may be adapted according to any teaching described herein, including, but not limited to any one or more of the following. The sixth aspect may be adapted according to any of the optional features described for the other aspects.

The non-transitory, computer-readable medium may further include instructions that, when executed by one or more processors, cause the one or more processors to perform operations comprising scanning the image of the diagram of the base structure of the network using a scanner.

The extracting may comprise recognizing one or more magnetic markers identifying network components.

The extracting may comprise employing computer vision techniques to extract the position and the size of the plurality of network components.

The non-transitory, computer-readable medium may further include instructions that, when executed by one or more processors, cause the one or more processors to perform operations including storing one or more network designs to a design database; and analyzing the one or more stored network designs to generate a list of network design suggestions.

The non-transitory, computer-readable medium may further include instructions that, when executed by one or more processors, cause the one or more processors to perform operations comprising preprocessing the image.

The non-transitory, computer-readable medium may further include instructions that, when executed by one or more processors, cause the one or more processors to perform operations including detecting one or more network architecture objects in the image; and labelling the one or more architecture objects in the image thereby creating an improved network model.

The labelling may be automatically performed based on said detecting.

In a seventh aspect, a computer-implemented method for network design assistance performed by one or more processors, the method including importing static design data from one or more public sources via a network; storing the static design data to a design database; ingesting live design data for a system architecture; and generating a recommended network model based on the static design data and the live design data using a model trainer. The seventh aspect may be adapted according to any teaching described herein, including, but not limited to any one or more of the following. The seventh aspect may be adapted according to any of the optional features described for the other aspects.

The computer-implemented method may further include storing the recommended network model to the design database; and training the model trainer based at least in part on a plurality of stored network models.

In an eighth aspect, an intelligent network generation system including one or more processors; and one or more memory devices comprising instructions that, when executed by the one or more processors, cause the one or more processors to perform operations including importing static design data from one or more public sources via a network; storing the static design data to a design database; ingesting live design data for a system architecture; and generating a recommended network model based on the static design data and the live design data using a model trainer. The eighth aspect may be adapted according to any teaching described herein, including, but not limited to any one or more of the following. The eighth aspect may be adapted according to any of the optional features described for the other aspects.

The intelligent network generation system may further include instructions that when executed by the one or more processors, cause the one or more processors to perform operations including storing the recommended network model to the design database; and training the model trainer based at least in part on a plurality of stored network models.

In a ninth aspect, a non-transitory, computer-readable medium includes instructions that, when executed by one or more processors, cause the one or more processors to perform operations including importing static design data from one or more public sources via a network; storing the static design data to a design database; ingesting live design data for a system architecture; and generating a recommended network model based on the static design data and the live design data using a model trainer. The ninth aspect may be adapted according to any teaching described herein, including, but not limited to any one or more of the following. The ninth aspect may be adapted according to any of the optional features described for the other aspects.

The non-transitory, computer-readable medium may further include instructions that, when executed by one or more processors, cause the one or more processors to perform operations includes storing the recommended network model to the design database; and training the model trainer based at least in part on a plurality of stored network models.

In a tenth aspect, a computer-implemented method for network design performed by one or more processors, the method including loading one or more network models stored in a database; determining whether the one or more network models are static; if the one or more network models are static: generate one or more synthetic design permutations to simulate a plurality of ways to create a design; and extracting one or more features of the network models used for model training. The tenth aspect may be adapted according to any teaching described herein, including, but not limited to any one or more of the following. The tenth aspect may be adapted according to any of the optional features described for the other aspects.

The computer-implemented method may further include training the one or more network models on a dataset; scoring the one or more network models based at least in part on the one or more features of the network models; and selecting a recommended network model based at least in part on the scoring.

In an eleventh aspect, a computer-implemented method for network design performed by one or more processors includes loading provider independent code from a database; partitioning the provider independent code thereby creating one or more partitions; generating provider dependent code for the one or more partitions using a provider code generator; and transmitting the provider dependent code to a provider to initiate deployment. The eleventh aspect may be adapted according to any teaching described herein, including, but not limited to any one or more of the following. The eleventh aspect may be adapted according to any of the optional features described for the other aspects.

In a twelfth aspect, a computer-implemented method for component ingestion performed by one or more processors, the method including receiving a provider schema from a schema ingestor; receiving one or more icons from an icon ingestor; receiving one or more application programming interfaces from an application programming interface ingestor; storing raw data from the provider schema, the one or more icons, and the one or more application programming interfaces in a database; processing the raw data to produce one or more component definitions using a component generator; and storing the one or more component definitions on the database for use in a design surface. The twelfth aspect may be adapted according to any teaching described herein, including, but not limited to any one or more of the following. The twelfth aspect may be adapted according to any of the optional features described for the other aspects.

BRIEF DESCRIPTION OF DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

The included drawings are for illustrative purposes and serve only to provide examples of possible structures and arrangements for the disclosed inventive apparatuses and methods for an immersive content production system. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Embodiments are directed at techniques for intelligent network design. The techniques provide for capturing a basic network design created by a network architect. The techniques process an image of the basic network design using computer vision and machine learning techniques to extract a position and a size of each of the network components in the basic network design. The techniques generate provider independent code data structure that reproduces the elements in the basic network diagram.

The provider independent code can be viewed and edited on a digital design surface. A design assistant can utilize machine learning to make design recommendations to the network architect. The designs can be stored and on deployment compiled into provider dependent code (PDC) before being transmitted to the target provider(s).

Figure 1:
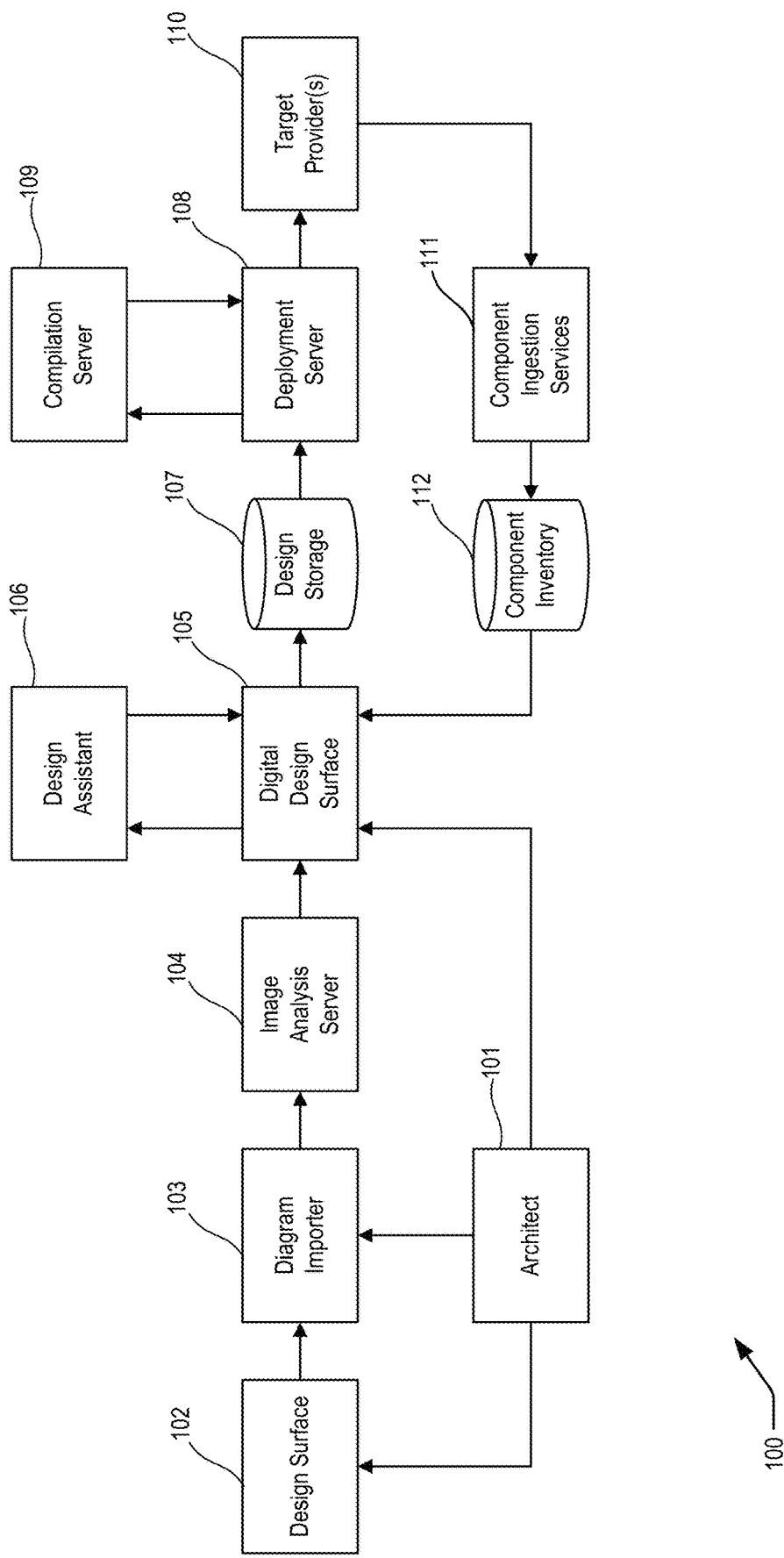
FIG. 1 illustrates an exemplary diagram for a process for intelligent network design.

FIG. 1 illustrates an exemplary diagram for a technique 100 for intelligent network design. In various embodiments, a network architect 101 can model a proposed network on a design surface 102 (e.g., a white board). The network architect 101 can use one or more marker pens and one or more markers to illustrate a basic network design on the design surface 102. The one or more markers can be magnetic markers. In some embodiments, the one or more markers can be adorned with component logos. In some embodiments, the design surface 102 can be an electronic smart board. In some embodiments, the design surface 102 can be a touch screen display. In some embodiments, the design surface 102 can be a digital screen. The design surface 102 may enable a user to freely design a proposed network prior to the design being electronically imported into a computer system. As an example, the design surface 102 may be used to create an initial diagram and an image of the design surface 102 may be captured, before image processing is undergone in order to derive a digital representation that could be imported and manipulated within a computer system.

The network architect 101 can use a design importer 103 to ingest the basic network design into the system. In various embodiments, an image of the design surface 102 can be captured and electronically transmitted to an image analysis server. In some embodiments, the smart board can detect one or more network connection lines and the one or more markers and transmit the basic network design to the image analysis server. In some embodiments, the techniques can capture the one or more network connection lines and the one or more markers on the touch-screen display and transmit the basic network design to the image analysis server. In some embodiments, the design importer 103 can be an image scanner.

The image analysis server 104 can process an image of the basic network design from the diagram importer 103. The image analysis server 104 can employ computer vision and machine learning techniques to extract a position and a size of each component in the image of the basic network design. The image analysis server 104 can generate provider-independent code (PIC) data structure that reproduces the elements found in the basic network design. The provider-independent code (PIC) data structure can be transmitted to a digital design surface 105. The PIC representation of the basic network design can be viewed and edited on the digital design surface 105. The digital design surface 105 may take the form of a suitably configured computer hardware device provided with appropriate software in order to enable the viewing and editing of the basic network designs in accordance with embodiments described herein. By way of example, this may include, but is not limited to, a PC, laptop or tablet PC provided with the appropriate software. The digital design surface 105 may also be provided with a touch screen enabled interface for viewing and editing of the basic network designs which runs the appropriate software directly. A design assistant 106 can make one or more recommendations to a network architect 101. The basic network design can be revised and stored in a design storage database 107. On deployment, the revised network design can be transmitted to the deployment server 108 and compiled by the compilation server 109 into provider-dependent code (PDC). The provider-dependent code (PDC) can be transmitted to the one or more target providers 110. The one or more target providers 110 can include but are not limited to Google Cloud Platform, Amazon Web Services, Microsoft Azure, IBM Cloud platform, Rackspace, VMware, Azure, etc. Each of the target providers 110 can employ different network components. The component ingestion service 111 imports the various platform components into the system for storage in the component inventory 112. The architect can utilize the one or more network components from the component inventory 112 when designing a system on the digital design surface 105.

Figure 2:
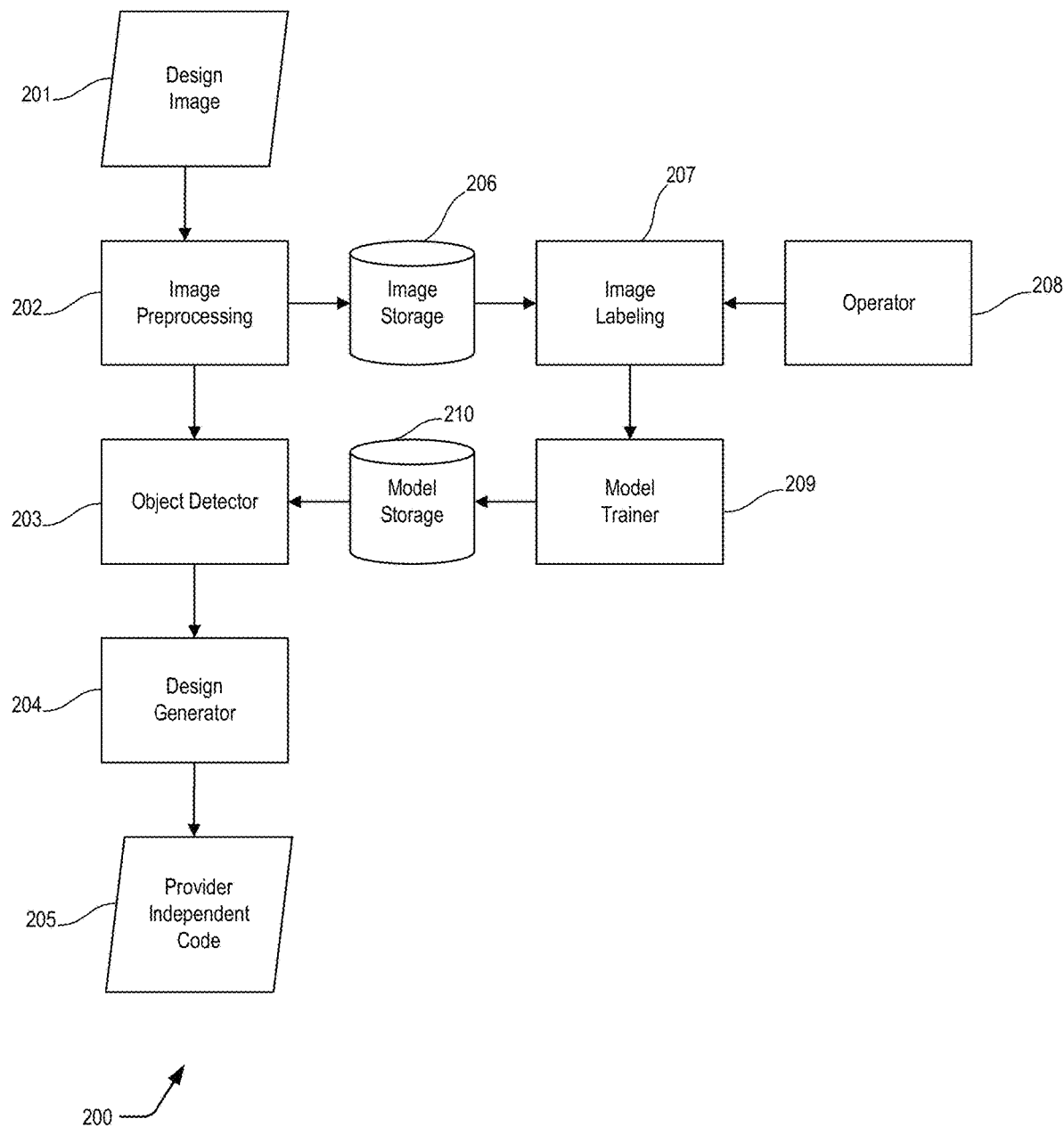
FIG. 2 illustrates an exemplary diagram for a process for image analysis.

FIG. 2 illustrates an exemplary diagram for an image analysis server 200 for image analysis. The image analysis server 200 receives an image 201 of the basic network design of a system architecture diagram created on a design surface 102, shown on FIG. 1. The image can optionally be preprocessed 202 to maximize the likelihood of successful object detection before being passed to the object detector 203. The preprocessing 202 can include at least one or more of the following processes: rotating, resizing, cropping, deskewing, and/or flattening the image. The various provider components are identified along with their bounding box and position. The design generator 204 collates the information generated by the object detector 203 and produces a simple provider independent code (PIC) 205 artifact.

Images received can be stored in a database 206 in order to improve the object detector 203. The images can be labelled in an image labeling process 207. In some embodiments, an operator 208 can label the images in order to increase the data set from which the model trainer 209 operates. In some embodiments, the image labeling process 207 conducts predictive analysis to recommend labels for selection by an operator 208. A model trainer 209 can learn from the labelling done by the operator 208 to associate objects detected in the design image 201 with network components. In some embodiments, improved models can be stored in the model storage 210 and utilized by the object detector 203.

The design generator 204 can receive the basic design image 201 including component labeling. The design generator 204 can recognize the network components and architecture described in the labelled design image to generate a provider-independent code 205 data structure. In some embodiments the provider-independent code can be stored in the design database.

Figure 3:
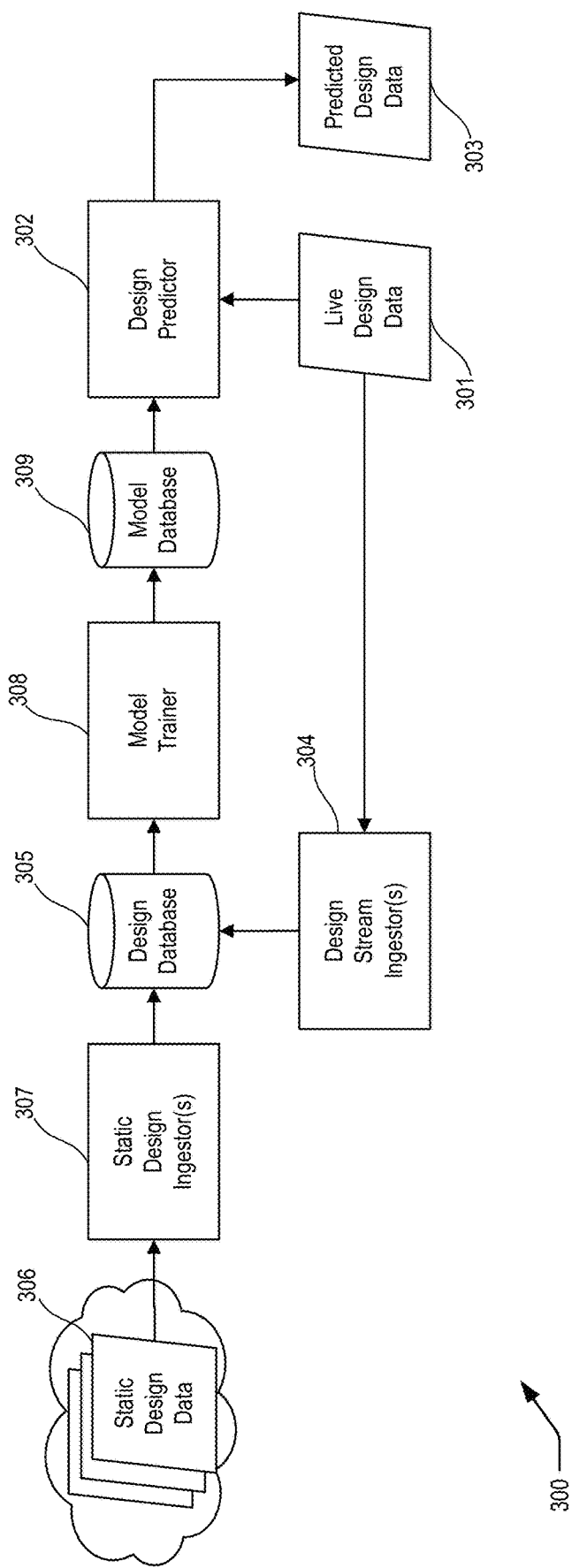
FIG. 3 illustrates an exemplary diagram for a design assistance process.

FIG. 3 illustrates an exemplary diagram for a design assistance process 300. In some embodiments, the live design data 301, can be sent to the design predictor 302. The live design data 301 can be be a data structure representing the components on the design surface. As the architect creates or edits the design, the system can send an inquiry regarding the current state of the design to the design predictor to get back a list of suggestions about what components the architect may be looking for next. A ranked list of design suggestions can be calculated and generate predicted design data 303. The design predictor can use, for example, a machine learning model when given live data as an input and can return a list of suggestions ranked by confidence level. In order to build a dataset for training and improving the prediction model, the live design data 301 can also be ingested via a design stream ingestor 304 and stored in a design database 305. The design stream ingestor 304 can be an application programming interface (API) that receives live design data and stores the data in the design database 305. Furthermore, static design data 306 can be retrieved from various public sources on the Internet via a static design ingestor 307 and stored in the design database 305. Static design data 306 can be a fixed representation of a system architecture. Static design data may be completed or represent a work in progress, but what differentiates it from live design data is that the static design data does not inform a user how that final state was arrived at. For example, if a static design contained components X, Y & Z a user does not know if the architect created it in the order of X, Y, Z or X, Z, Y or Y, Z, X etc. With live design data 305, the system provides a stream of states, e.g., X, followed by X, Y followed by X, Y, Z that gives us the exact order in which the final state X, Y, Z was arrived at. In some embodiments, the public sources can be the public websites of a cloud service provider. Both the live design data 301 and static design data 306 can be used by the model trainer 308 in order to create, improve, and store models used by the design predictor 302 in the model database 309.

Figure 4:
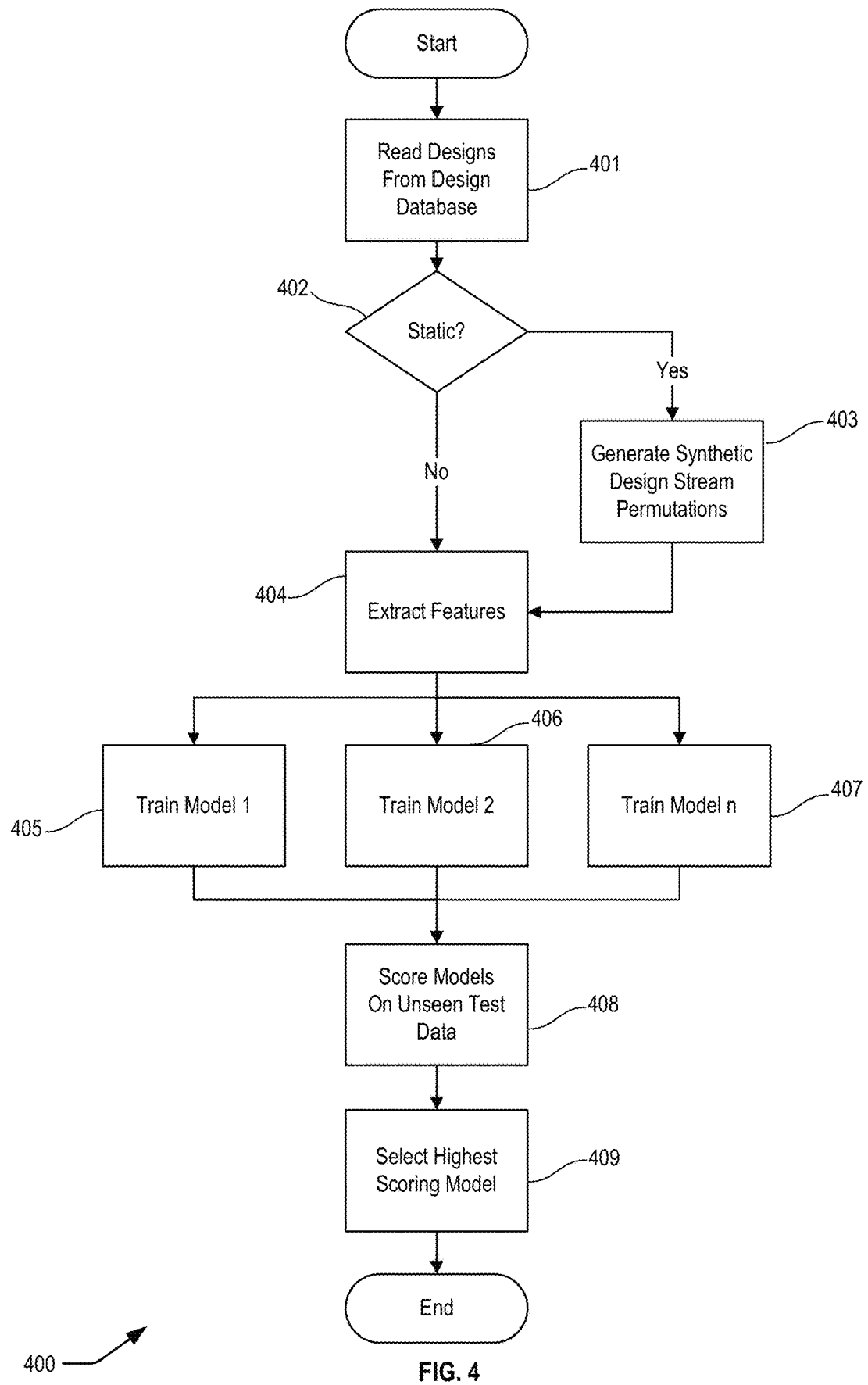
FIG. 4 illustrates an exemplary diagram for a model trainer process.

FIG. 4 illustrates an exemplary diagram for a design assistance model trainer process 400. Designs can be read from a design database 401. The process 400 can determine 402 if the network design is static or not. If the network design is static, all possible design streams can be synthetically created 403 in order to simulate the various ways a design could have been created. For example, the system would be able to generate all possible permutations of sequences for a design to arrive at a final state (e.g., X, Y, and Z as described above). The design streams can then be processed in order to extract features 404 required for model training. The design features 404 can include which components are included, the count of each component, links between components, properties/settings of each component, position of each component, etc. A dataset can be extracted from the live and static data. The extraction process can transform static data to synthetic live data. Features 404 can be extracted from the live and static data to create a new data set. The new dataset can be separated into a training set and a test set. The model can be trained on a training set (i.e., using n-fold cross validation) and finally test the produced models on the test data. Various models 405, 406, 407 can be trained on the dataset from the extracted features 404 and then scored 408 against the test data. The training can use one or more neural network techniques for scoring. For example, multi-label models can use a Hamming loss scoring criteria. For multi-class models, F1 score can be used. Other metrics can be also used to evaluate the various machine learning models. The Hamming loss, the F1 score technique, or some other scoring technique can be an numerical output used to evaluate the machine learning model. The highest performing model can be selected 409.

Training a model can be done to ensure a proper fit. Without training, an overfit can occur without the knowledge of the algorithm designer. A model can be judged on its ability to predict new unseen data. Training sets data can be used to fit and tune the model. Test set data can be used as "unseen" data to evaluate the model. The training set data should be separated from the test set data. If the model performs well on the training data but performs poorly on the test data, there is likely an overfit.

Cross-validations is a method for getting reliable estimate of model performance using only the training data. The cross-validation process varies the hyperparameters to generate a cross-validated score for each set of hyperparameter values for each algorithm. Then, the best set of hyperparameters can be selected within each algorithm.

The minimum Hamming distance can be used to define some notions in coding theory, such as error detecting an error correcting codes. The Hamming distance between two strings of equal length is the number of positions at which the corresponding symbols are different. In other words, it measures the minimum number of substitutions required to change one string into the other, or the minimum number of errors that could have transformed one string into the other. In a more general context, the Hamming distance is one of several string metrics for measuring the edit distance between two sequences. In particular, a code C is said to be k error detecting if, and only if, the minimum Hamming distance between any two of its codewords is at least k+1. A code C is said to be k-errors correcting if, for every word w in the underlying Hamming space H, there exists at most one codeword c (from C) such that the Hamming distance between w and c is at most k. A code is k-errors correcting if, and only if, the minimum Hamming distance between any two of its codewords is at least 2k+1.

F1 score can be used in machine learning. It is a measure of a test's accuracy. It considers both the precision p and the recall r of the test to compute the score: p is the number of correct positive results divided by the number of all positive results returned by the classifier, and r is the number of correct positive results divided by the number of all relevant samples (all samples that should have been identified as positive). The F1 score is the harmonic average of the precision and recall, where an F1 score reaches its best value at 1 (perfect precision and recall) and worst at 0. The traditional F1 score is the harmonic mean of precision and recall:

$$F_1 = \left( \frac{recall^{-1} + precision^{-1}}{2} \right)^{-1} = 2 \cdot \frac{precision \cdot recall}{precision + recall}.$$

Figure 5:
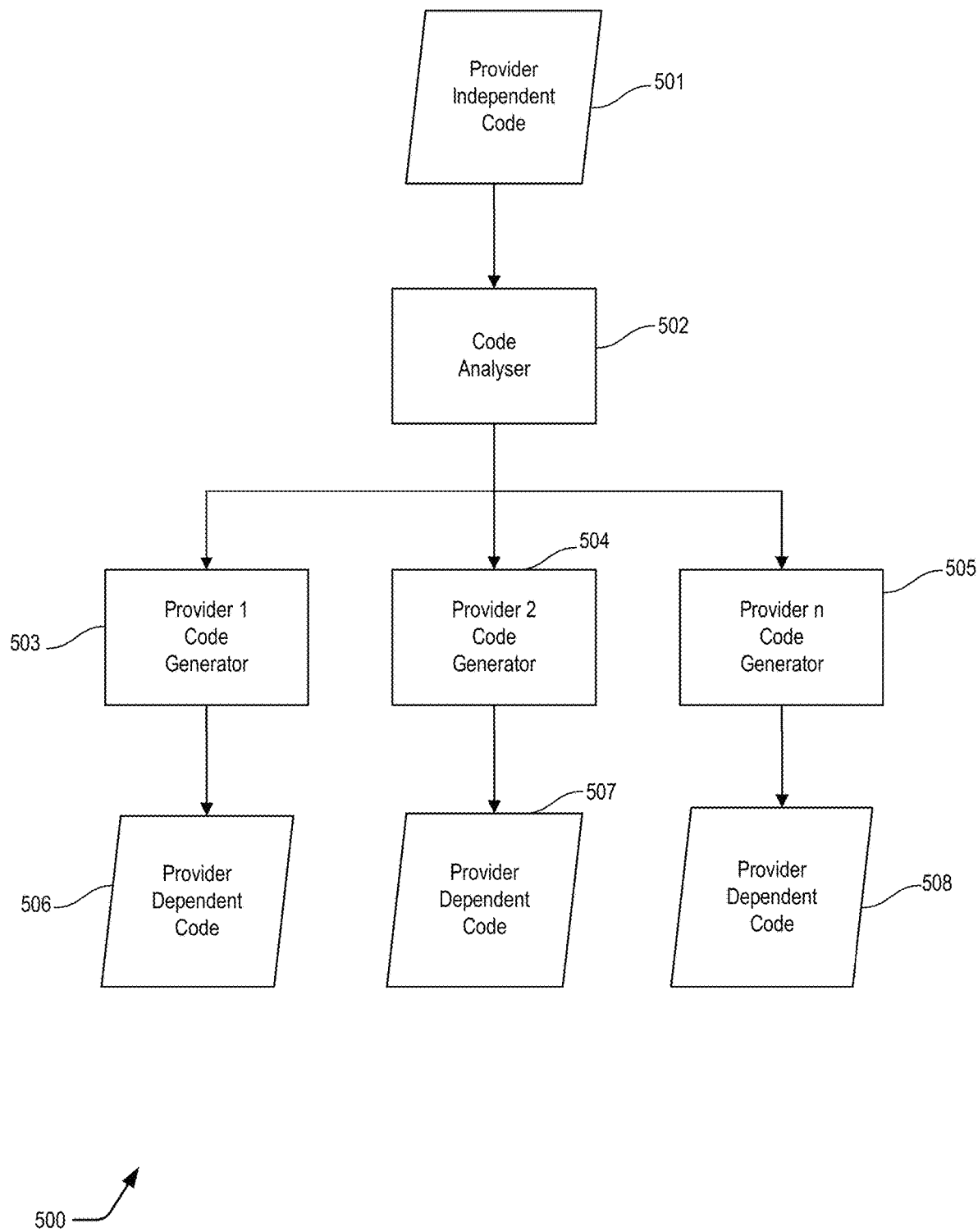
FIG. 5 illustrates an exemplary diagram for a compilation process.

FIG. 5 illustrates an exemplary diagram for a compilation process 500. The provider independent code 501 can be read by a code analyzer 502. The code analyzer 502 receives the provider independent code 501 and analyzes the code in order to partition it into multiple partitions. The multiple partitions can be determined based on the network provider. Next, the compilation process employs appropriate Provider Code Generator (PCG) modules 503, 504, 505 for each partition. Each PCG generates Provider Dependent Code (PDC) 506, 507, 508 that can be transmitted to a provider in order to initiate a deployment.

Figure 6:
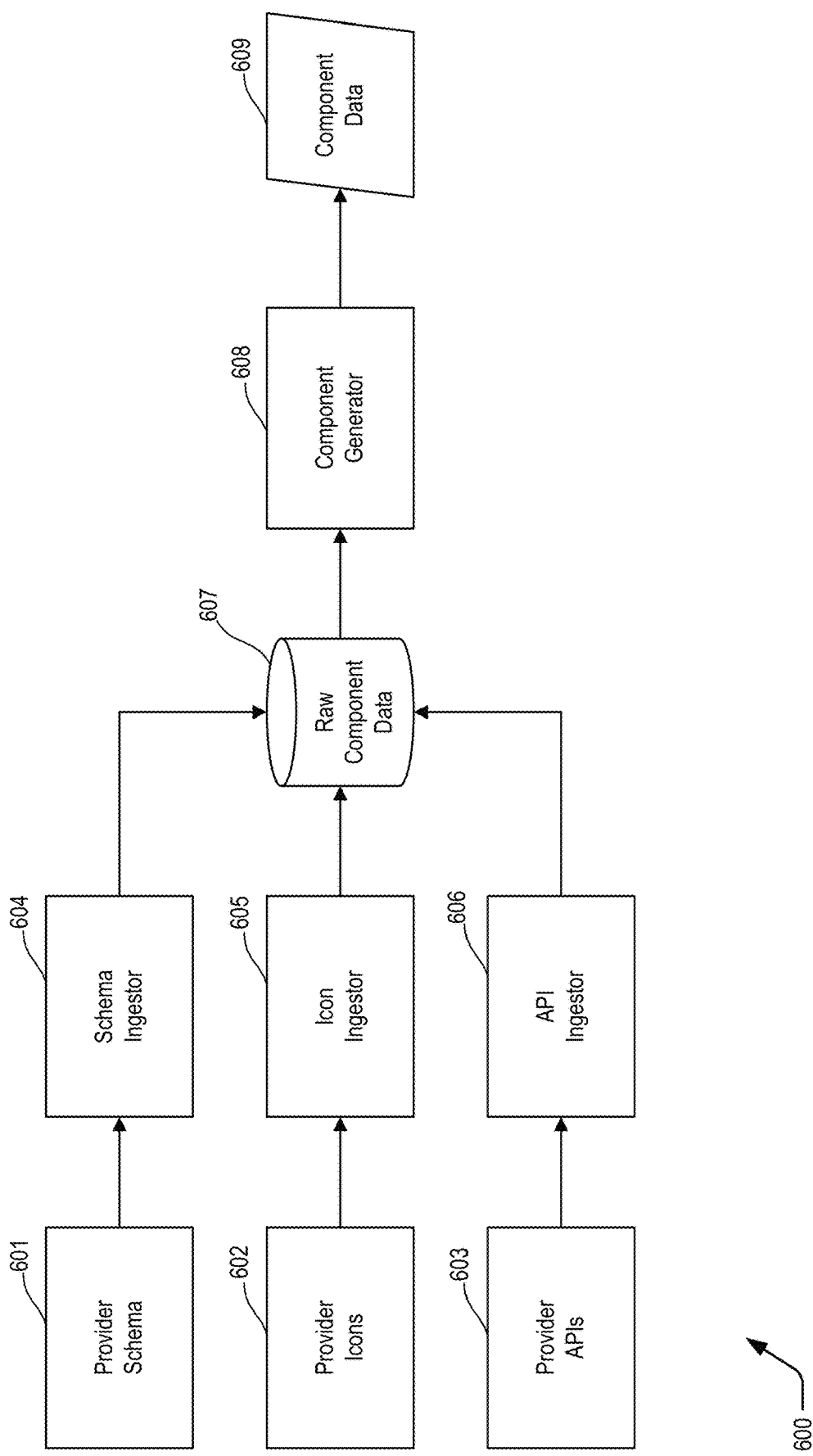
FIG. 6 illustrates an exemplary diagram for a component ingestion process.

FIG. 6 illustrates an exemplary diagram for a component ingestion process 600. Various sources of component definition data such as provider schema 601, provider icons 602, and provider application programming interfaces 603 can be ingested by specialized ingestion services (e.g., schema ingestor 604, icon ingestor 605, and application programming interface ingestor 606). The provider specific information can be stored in a raw component database 607 for further processing. The component generator 608 can process the raw data and produce component data 609 which can be stored in the component inventory 112, shown in FIG. 1, for use on the digital design surface 105, shown in FIG. 1.

Figure 7A:
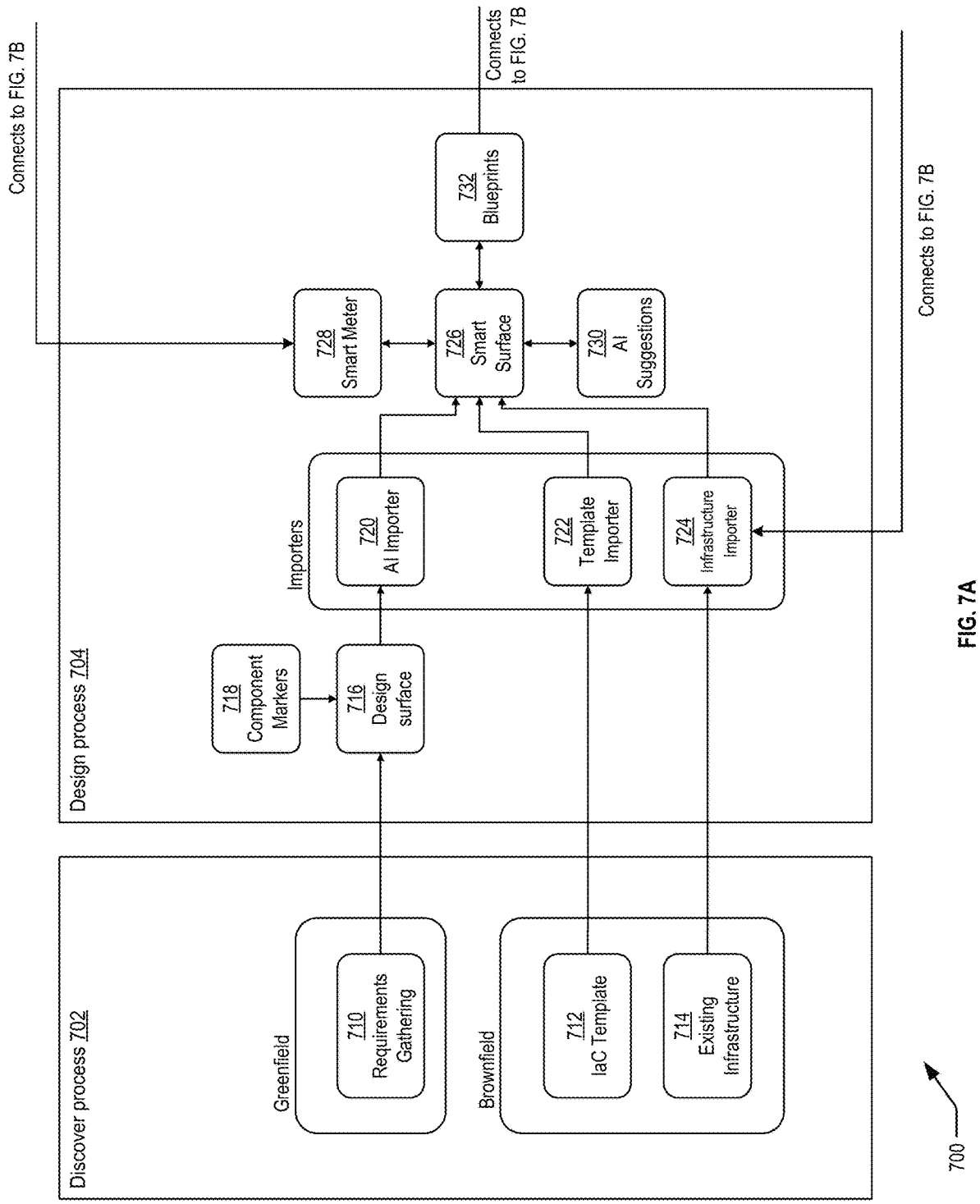
FIG. 7A illustrates a first portion of a diagram of an exemplary process for intelligent network design.
Figure 7B:
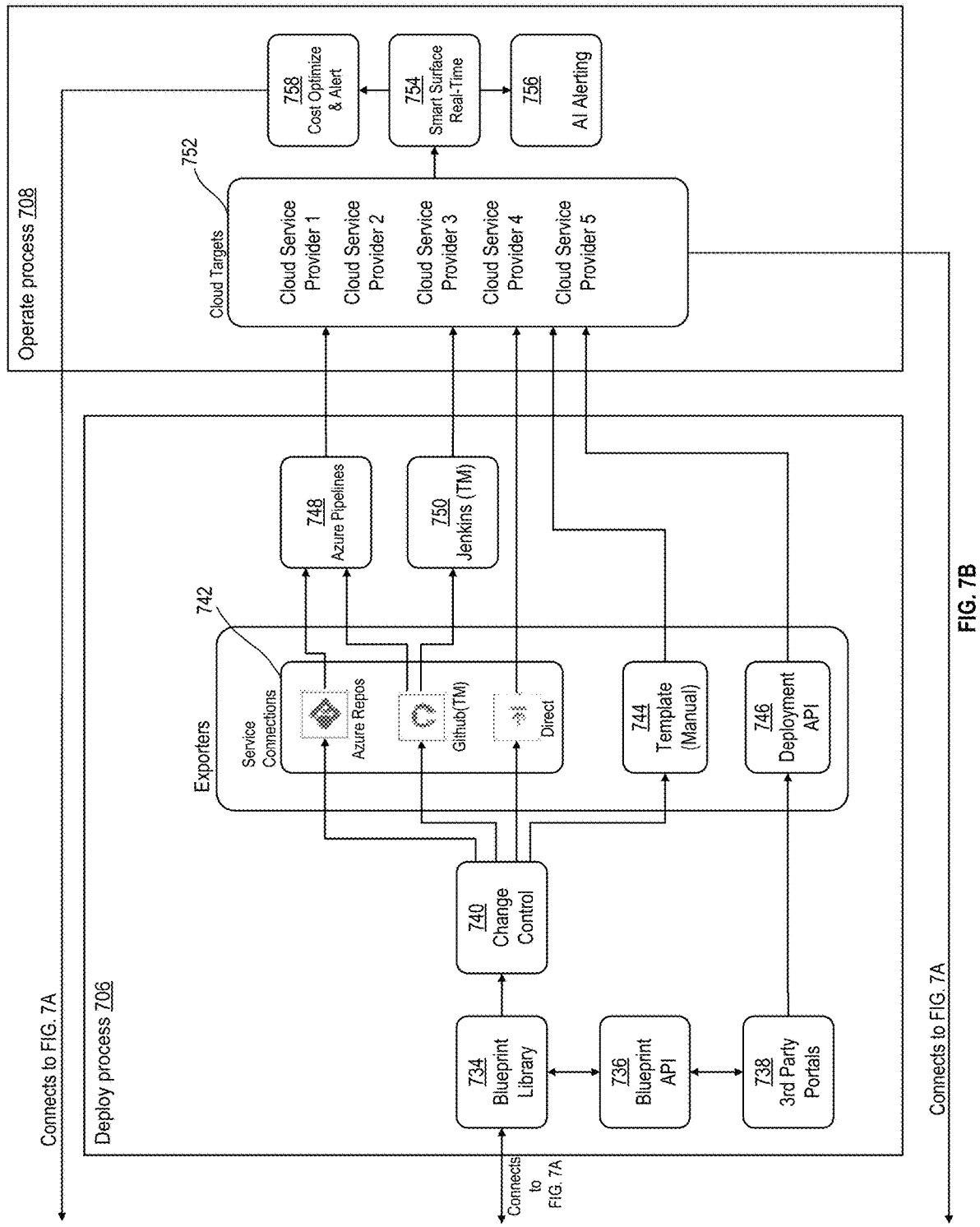
FIG. 7B illustrates a second portion of a diagram of an exemplary process for intelligent network design.

FIGS. 7A and 7B. illustrate an exemplary blueprint of a technique for intelligent network design. The exemplary blueprint 700 illustrates four sub-processes including discover process 702, design process 704, deploy process 706, and operate process 708. FIGS. 7A and 7B illustrate a technique for intelligent network design which may be considered a more detailed explanation of the technique of FIG. 1. As such, the features and elements of FIG. 1 may correspond to various elements of FIGS. 7A and 7B.

In the discover process 702, requirements can be gathered from a customer to determine the desired parameters for the network. The requirements can include, but are not limited to: number of users, type of data stored, use of data, availability of data, size of the network, storage requirements, connectivity, security, bandwidth, and agility. The requirements gathering 710 can include one or more discussions between a customer and a network architect. The discussion can include designing a basic network architecture on surface such as a whiteboard. One or more images can be captured of the basic network architecture.

Often customers have an existing network infrastructure that they want transitioned to a new architecture. The existing networks can include one or more infrastructure as code (IaC) templates 712 and existing infrastructure 714. In the discover process 702, infrastructure as code (IaC) templates 712 can be identified for use in the network design. Infrastructure as code (IaC) templates 712 are machine-readable files to automatically manage and provision the technology stack for an application through software, rather than using a manual process to configure discrete hardware devices and operating systems. Infrastructure as code is sometimes referred to as programmable or software-defined infrastructure. The concept of infrastructure as code is similar to programming scripts, which are used to automate IT processes. However, scripts are primarily used to automate a series of static steps that must be repeated numerous times across multiple servers. Infrastructure as code uses higher-level or descriptive language to code more versatile and adaptive provisioning and deployment processes. Infrastructure as code can configured on a template 712, where the user specifies the resources needed for each server in the infrastructure. The template can be used to either verify that a system is properly configured or put it in the appropriate setup. Templates 712 can be constructed as a set of layers of resources, such as in AWS CloudFormation, which makes a stack.

During the discovery process 702, existing network infrastructure 714 can be identified for use the network design. In the case of the IaC templates 712, the precise set of components can be defined in the IaC template file. The system can convert these IaC templates 712 from an IaC file format to a system representation, e.g., PIC. The IaC templates 712 can then be edited in the smart surface 726. For existing infrastructure 714, the import process can target specific sets of infrastructure components as defined by the architect. The targeting can include selecting a logical container that groups related components together. For example, if the existing infrastructure was on Microsoft Azure, the import could target a Resource Group, which contains one or more Azure components. The difference between the IaC templates 712 and the existing infrastructure 714 is essentially that the IAC templates 712 relate to importing some code/offline representation of an existing infrastructure whereas the existing infrastructure 714 refers to importing from a live/online infrastructure. The existing network infrastructure 714 can include infrastructure of an existing network for the same client that is being changed or infrastructure from other existing networks for other clients. The system can import the contents of the IaC template 712 source code or live infra for existing infrastructure 714. Once imported, the architect can then re-factor the system architecture in the smart surface 726 by adding new components, removing components, changing settings, etc. The referenced design surface 716 may be equivalent to the design surface 102 of FIG. 1. The design surface 716 may enable a user to freely design a proposed network prior to the design being electronically imported into a computer system. As an example, the design surface 716 may be used to create an initial diagram and an image of the design surface 716 may be captured, before image processing is undergone in order to derive a digital representation that could be imported and manipulated within a computer system.

The architect can then deploy it back to the existing infrastructure 714 to a new infrastructure. For example, in one use case an architect wants to migrate from an on-premises data center to a cloud-based data center e.g., Azure. No IaC templates 712 are available so they target the live data center and import the discovered resources into the smart surface 726. Now the architect re-factors the design to use Azure components and can deploy it to Azure. Another example is an existing system running in Azure that has been previously managed via the Azure portal. The architect can import from resource group the system is contained in and now has a visual representation in the design surface 716. After importation, the architect can edit the system using the design surface 716 instead of the Azure portal.

In some embodiments, during the design process 704, the network requirements 710 can be entered and/or displayed on a design surface 716. In various embodiments, a user can model a proposed network on a design surface 716 (e.g., a white board). The user can design the network using one or more marker pens and one or more component markers 718 to illustrate a basic network design on the design surface 716. The one or more markers 718 can be magnetic markers. In some embodiments, the one or more markers 718 can be adorned with component logos. In some embodiments, the design surface 716 can be an electronic smart board. In some embodiments, the design surface 716 can be a touch screen display. The user can illustrate a basic design structure on the design surface 716.

The basic design structure can be imported into the computing system via the artificial intelligence importer 720. The artificial intelligence importer 720 can employ computer vision and machine learning techniques to extract a position and a size of each component in the basic network design. A template importer 722 can import one or more infrastructure as code (IaC) templates 712. In addition the infrastructure importer 724 can import the existing infrastructure 714 and information from the one or more cloud targets 752 (network providers).

The basic design structure, the templates, and the infrastructure can be provided to the smart surface 726. The referenced smart surface 726 may be equivalent to the digital design surface 105 of FIG. 1. The basic design infrastructure can be viewed and edited on the smart surface 726. The smart surface 726 may take the form of a suitably configured computer hardware device provided with appropriate software in order to enable the viewing and editing of the basic network designs in accordance with embodiments described herein. By way of example, this may include, but is not limited to, a PC, laptop or tablet PC provided with the appropriate software. The smart surface 726 may also be provided with a touch screen enabled interface for viewing and editing of the basic network designs which runs the appropriate software directly. The design assistant can utilize machine learning to make artificial intelligence suggestions 730 to the user. The artificial intelligence suggestions 730 can include suggestions for Cost Optimization, Simplification, Disaster Recovery, Security, and Availability. For example, for Cost Optimization and simplification can suggest replacing Infrastructure as a Service (IaaS) virtual machine Database Server with a Platform as a Service (PaaS) Database Service. For Disaster Recovery, the suggestion can be to enable backup on IaaS virtual machines. For Security, a suggestion can be to restrict network access to port 3389 from the Internet on IaaS virtual machines. For High Availability, the suggestion can be to make system multi-region. For High Availability, the suggestion can be to make system multi-cloud. The smart surface 726 can receive information from the smart meter 728. The interaction between smart meter 728 and the smart surface 726 is that as the architect selects components and places them within a system design, the smart surface will call the smart meter 728 service to request pricing information so that the architect can price the solution as the system is being built. So the smart surface 726 makes a request containing the current design state to smart meter 728 and receives a response with the current pricing estimate. The smart surface 726 can provide one or more network architecture blueprints 732. The network architecture blueprints 732 can be of varying details. For example, blueprints 732 for executives can provide less detail than blueprints 732 for network engineers.

FIG. 7B is a continuation of FIG. 7A. FIG. 7B illustrates the deploy process 706 and the operate process 708. The blueprints 732, shown in FIG. 7A, can be stored in the blueprint library 734. The blueprint application programming interfaces (API) 736 can be exported from the blueprints 732. The blueprint API 736 can be provided to third party portals 738. The blueprints 732 can be provided to a change control module 740. The change control module 740 can export the network blueprints 732 to various service connections 742 to include, but not be limited to, Azure Repos, Github, and Direct. Azure Repos is a set of version control tools that you can use to manage your code. Version control systems are software that help developers track changes they make in their code over time. As developers edit their code, they can tell the version control system to take a snapshot of their files. The version control system saves that snapshot permanently so they can recall it later if they need it. GitHub is a web-based hosting service for version control using Git, a distributed version-control system for tracking changes in source code during software development. Git is designed for coordinating work among programmers, but it can be used to track changes in any set of files. It is mostly used for computer code. GitHub is a web-based hosting service for version control using Git. It offers all of the distributed version control and source code management (SCM) functionality of Git as well as adding its own features. The version control tools can transmit to integration and delivery services 748 such as Azure pipelines or open source automation servers 750 such as Jenkins. From these integration and delivery services 748 or open source automation servers 750 the code can be transmitted to the cloud targets 752. In some embodiments, the change control module 740 can export the network blueprints 732 directly to integration and delivery services 748 such as Azure pipelines or open source automation servers 750 such as Jenkins without requiring the use of the various service connections 742 described above. It is to be appreciated that the examples given above in respect of the service connections 742, integration and delivery services 748 and open source automation servers 750 are for illustration purposes only, and it is envisaged that further examples of these features may equally be implemented within the framework of embodiments described above.

In an alternate path, the change control module 740 can provide manual templates 744 which can be implemented on one or more of the cloud targets 752.

In another alternate path, the blueprint APIs 736 can be provided to third-party portals 738. An exporter can provide deployment API 746 from the blueprint APIs 736 and the deployment API 746 can be transmitted to the cloud targets 752.

During the operate process 708, the smart surface can receive real-time information 754 from the one or more cloud targets 752. The real-time information can be used to monitor the performance of the network architecture. The smart surface can transit cost optimization and other alerts 758 to the smart meter 728, shown in FIG. 7A. Cost optimizations can broadly be broken down into two categories: design-time and run-time. Design-time cost optimizations are those that the system can suggest based on the intended workload and state of the design. For example, an architect may choose to run a database server on a virtual machine (e.g. IaaS, infrastructure as a service)—the system can suggest a cheaper alternative in the form of a PaaS database service that provides the same functionality at a lower cost. Run-time cost optimizations can be detected in a live deployment. For example, the system can detect that a particular virtual machine is running at only 10% utilization. The system can suggest a lower performance (and cheaper) virtual machine type that would be a more appropriate fit for the detected workload.

Further the program dependent code can be sent directly to one or more of the cloud targets. By way of example and not of limitation, the cloud targets can include: Google Cloud Platform, Amazon Web Services, Microsoft Azure, IBM Cloud platform, Rackspace, VMware, Azure, etc. The AI Alerting 756 feature aggregates monitoring alerts from various providers hosting the live deployments and surfaces them to operation staff.

Figure 8:
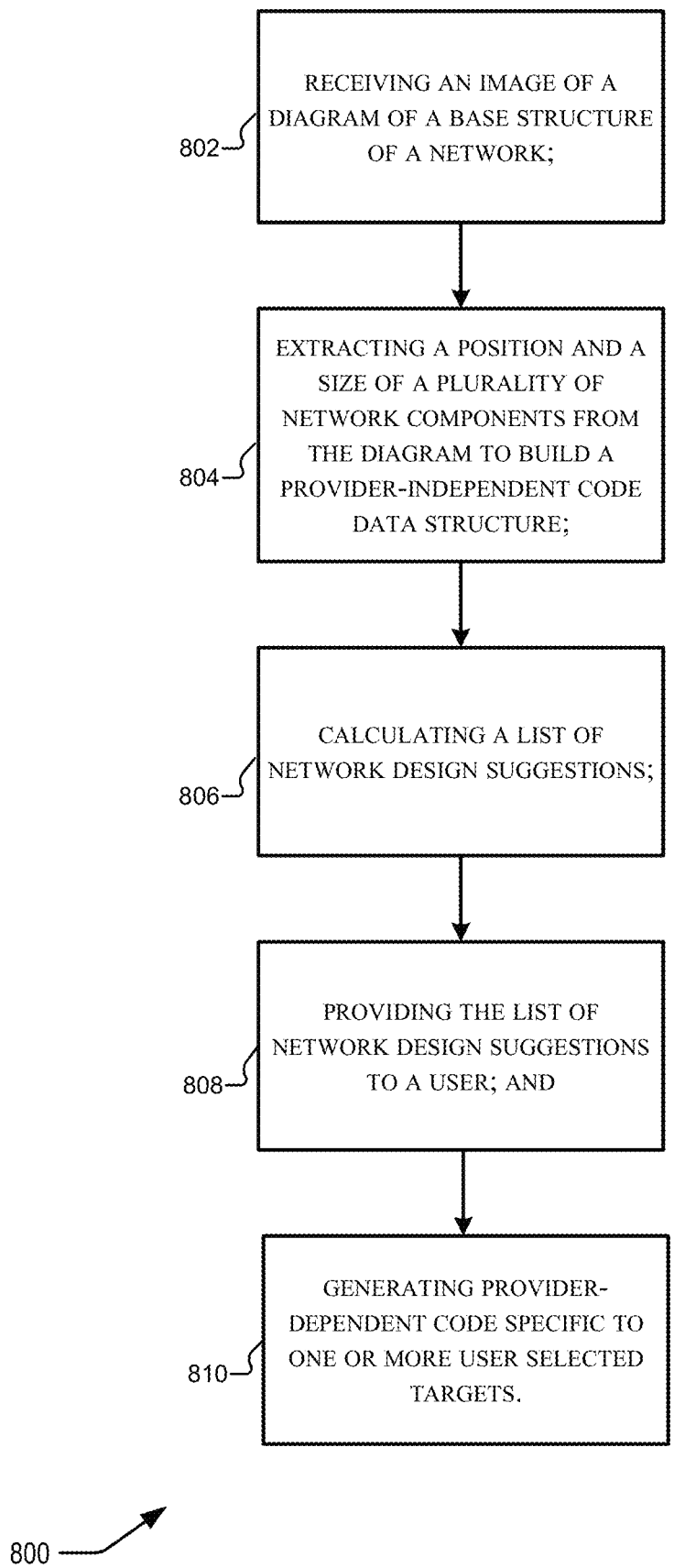
FIG. 8 illustrates an exemplary process flow for a technique for intelligent network design.

FIG. 8 illustrates an exemplary process flowchart 800 for a technique for intelligent network design. At 802, the technique can include receiving an image of a diagram of a base structure of a network. A network architect can discuss the requirements of the network with the customer and generate a base structure of a network on a design surface (e.g., a whiteboard). One or more magnetic markers can be used by the architect to design the system. The magnetic markers can be adorned with the network component logs. An image of the base network design can be captured by a digital camera, a smartboard, or other computer vision techniques.

At 804, the technique can extract a position and a size of the network components from the base diagram to generate provider-independent code data structure. The technique can use computer vision and machine learning techniques for extracting the position and size of the network components. The markers can also have near field communication (NFC) or radio frequency identification (RFID) which can automatically be detected by the system.

At 806, the technique can include calculating a list of network design suggestions. The design suggestions can be generated by analyzing the live design data, the history of the network architect designs, one or more previous designs, and various suggestions from one or more providers.

At 808, the technique can include providing the list of network design suggestions to a user. The network design suggestions can be presented to the architect on a digital design surface. The suggestions can include various provider components, configurations, or algorithms. The suggestions can be provider recommended routines. The suggestions can be based on the history of a network designer, recommending suggestions routinely used by the specific architect in his or her previous designs.

At 810, the technique can include generating provider-dependent code specific to one or more user selected targets.

In some embodiments, the method can include storing one or more network designs to a design database. The method can also include analyzing the one or more stored network designs to inform the list of network design suggestions. In some embodiments, the one or more network designs are created by the user.

In various embodiments, extracting the position and the size of the plurality of network components can include preprocessing the image, detecting one or more network architecture objects in the image, labelling the one or more architecture objects in the image creating an improved network model; and generating the provider-independent code data structure.

In various embodiments, the method can further include storing the improved network model to a database; and analyzing the improved network model to train an object detector.

In various embodiments, the technique can include providing a suggested label for the one more architecture objects to the user.

In various embodiments, the technique can include importing static design data from one or more public sources via a network; and storing the static design data to a design database.

In various embodiments, the technique can include simulating a plurality of network models using a design assistance model trainer using the static design data the provider-independent code data structure, extracting one or more features of the plurality of network models; and scoring the plurality of network models to select a recommended model.

Figure 9:
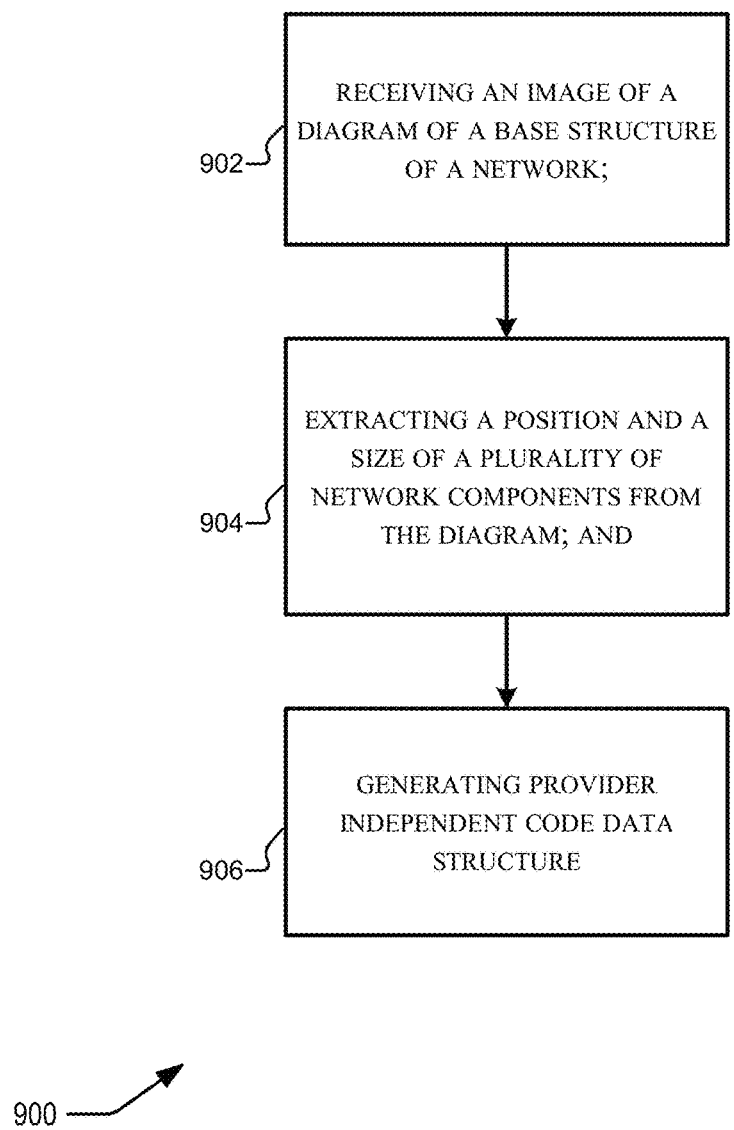
FIG. 9 illustrates an exemplary process flow for a technique for image analysis.

FIG. 9 illustrates an exemplary process flowchart 900 for a technique for image analysis. At 902, the technique can include receiving an image of a diagram of a base structure of a network. A network architect can discuss the requirements of the network with the customer and generate a base structure of a network on a design surface (e.g., a whiteboard). One or more magnetic markers can be used by the architect to design the system. The magnetic markers can be adorned with the network component logs. An image of the base network design can be captured by a digital camera, a smartboard, or other computer vision techniques. At 904, the technique can extract a position and a size of the network components from the base diagram to generate provider-independent code data structure. The technique can use computer vision and machine learning techniques for extracting the position and size of the network components. At 906, the technique can include generating provider independent code data structure.

In various embodiments, the computer-implemented method further includes scanning the image of the diagram of the base structure of the network using a scanner.

In various embodiments, extracting comprises recognizing one or more magnetic markers identifying network components. In various embodiments, extracting comprises employing computer vision techniques to extract the position and the size of the plurality of network components.

In various embodiments, the computer-implemented method further includes storing one or more network designs to a design database; and analyzing the one or more stored network designs to generate a list of network design suggestions. In various embodiments, the computer-implemented method further includes preprocessing the image.

In various embodiments, the computer-implemented method further includes detecting one or more network architecture objects in the image; and labelling the one or more architecture objects in the image thereby creating an improved network model. In various embodiments, the labelling is automatically performed based on said detecting.

Figure 10:
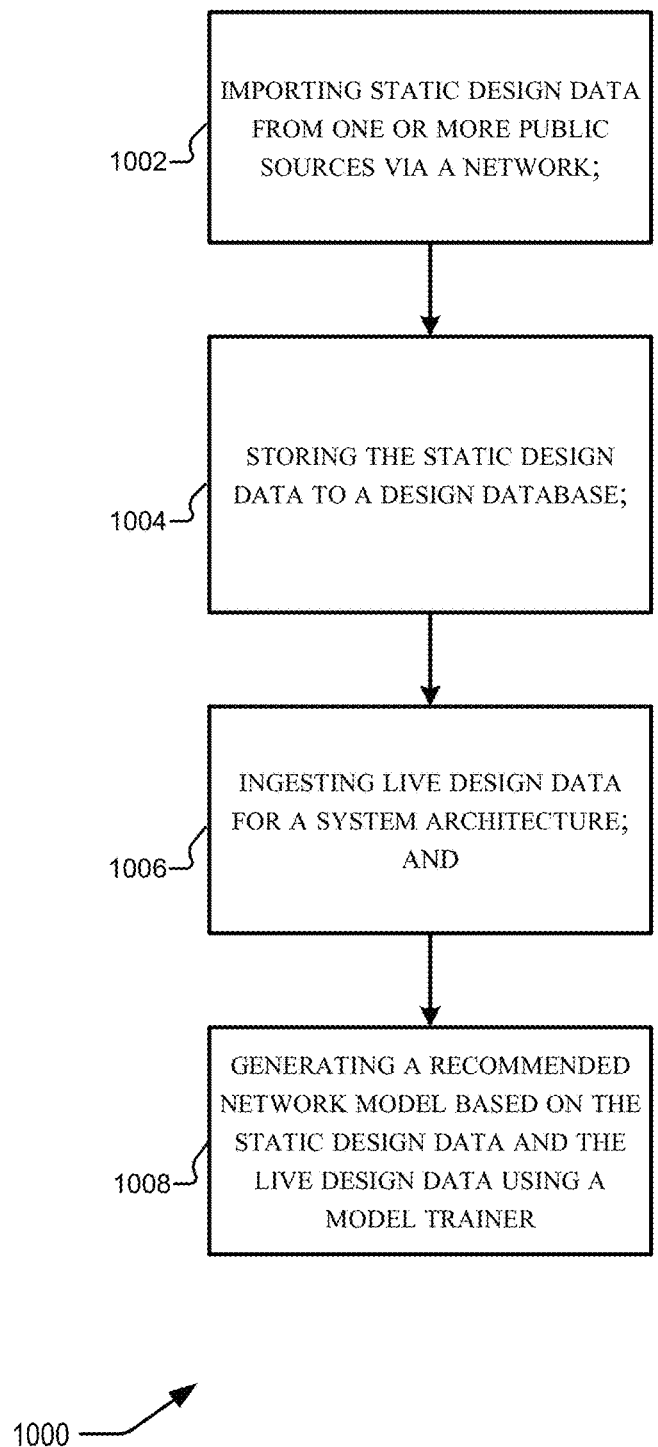
FIG. 10 illustrates an exemplary process flow for a model trainer process.

FIG. 10 illustrates an exemplary process flowchart 1000 for a model trainer process. At 1002, the technique can include importing static design data from one or more public sources via a network. In some embodiments, the network can be the Internet. At 1004, the technique can include storing the design data to a design database. At 1006, the techniques can include ingesting live design data for a system architecture. At 1008, the techniques can include generating a recommended network model based at least in part on the static design data and the live design data using the model trainer.

In various embodiments, the computer-implemented method further includes storing the recommended network model to the design database; and training the model trainer based at least in part on a plurality of stored network models.

Figure 11:
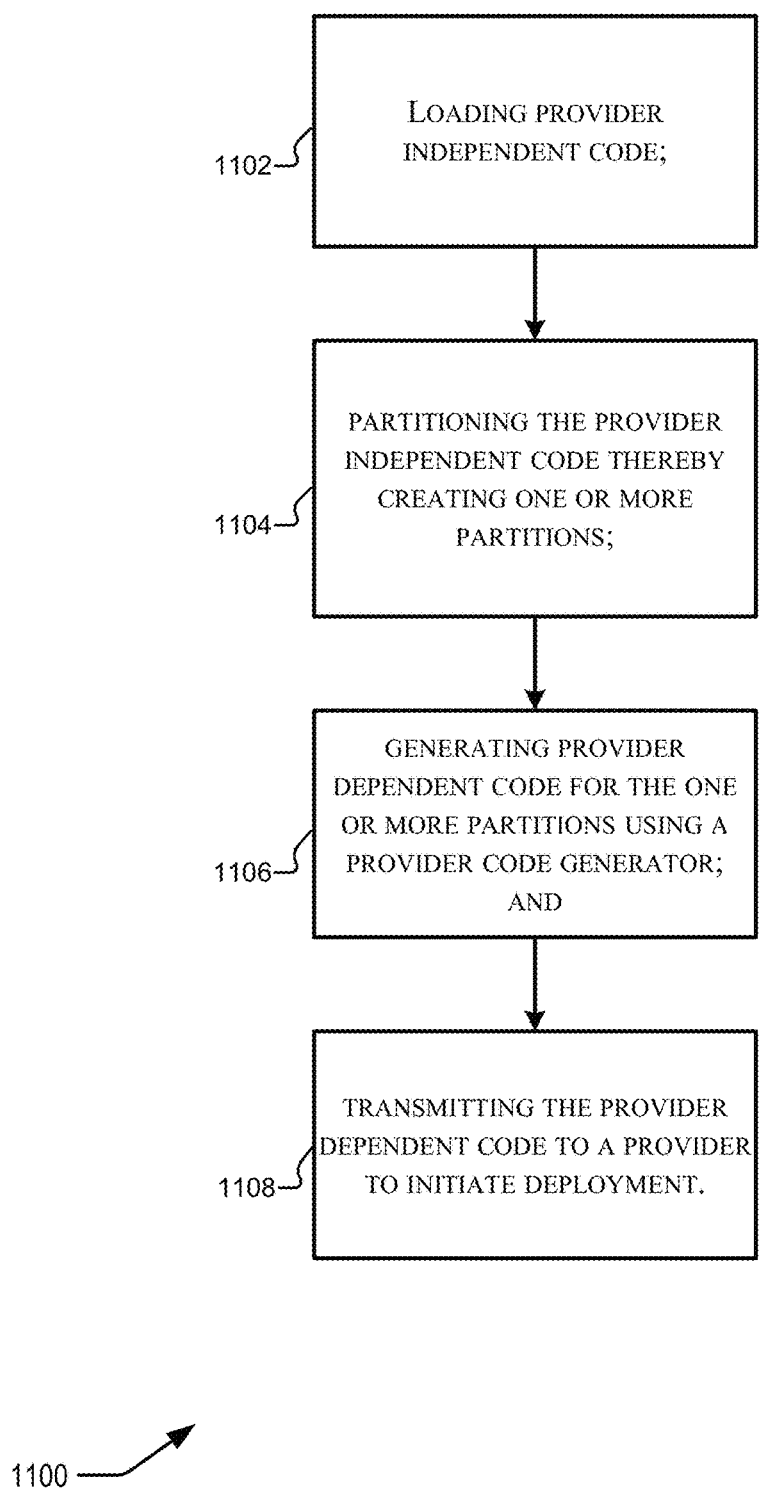
FIG. 11 illustrates an exemplary process flow for code compilation.

FIG. 11 illustrates an exemplary process flowchart 1100 for code compilation. At 1102, the technique can include loading provider independent code from a database. At 1104, the technique can include partitioning the provider independent code thereby creating one or more partitions. At 1106, the technique can include generating provider dependent code for the one or more partitions using a provider code generator. At 1108, the technique can include transmitting the provider dependent code to a provider to initiate deployment.

In various embodiments, the computer-implemented method further includes training the one or more network models on a dataset; scoring the one or more network models based at least in part on the one or more features of the network models; and selecting a recommended network model based at least in part on the scoring.

Figure 12:
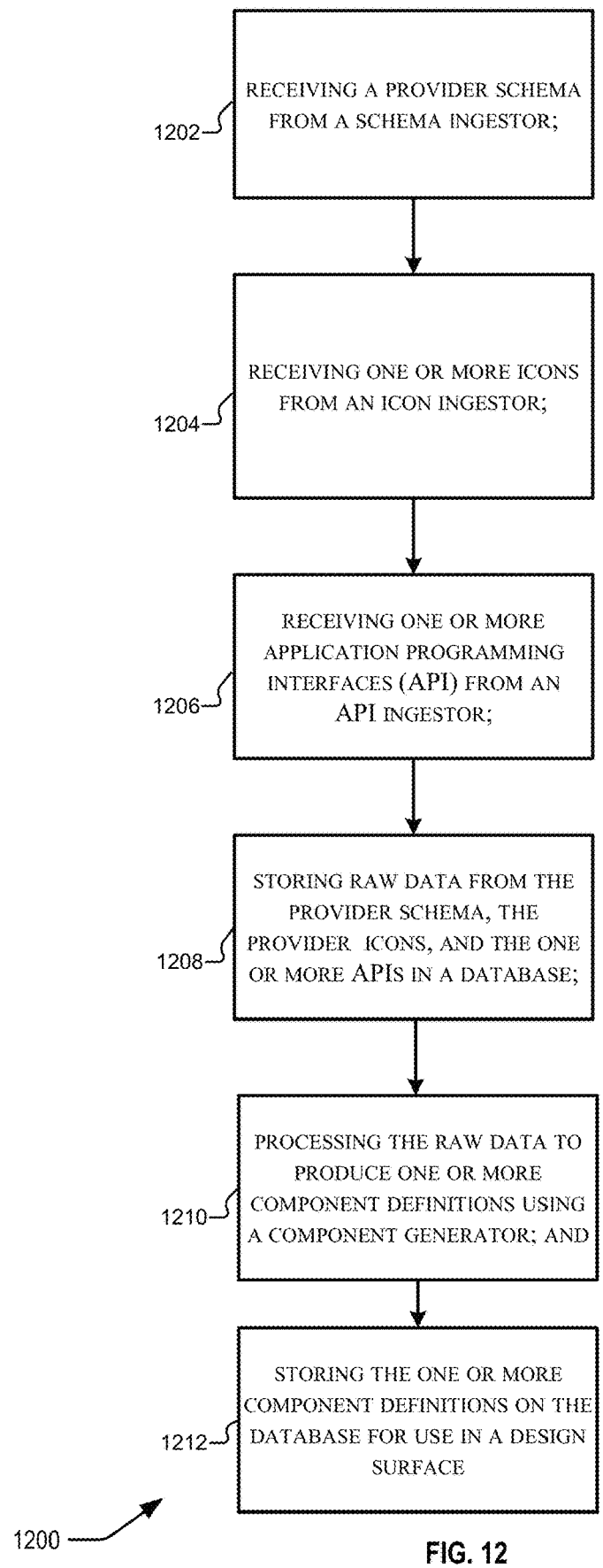
FIG. 12 illustrates an exemplary process flow for component ingestion.

FIG. 12 illustrates an exemplary process flowchart 1200 for component ingestion. At 1202, the technique can include receiving a provider network schema from a schema ingestor. At 1204, the technique can include receiving one or more provider icons from an icon ingestor. At 1206, the technique can include receiving one or more application programming interfaces (API) from an API ingestor. At 1208, the technique can include storing raw data from the provider schema, the provider icons, and the one or more APIs in a database. At 1210, the technique can include processing the raw data to produce one or more component definitions using a component generator. At 1212, the technique can include storing the one or more component definitions on the database for use in a design surface.

It should be appreciated that the specific steps illustrated in FIGS. 8, 9, 10, 11, and 12 provide particular methods intelligent network design according to various embodiments of the present disclosure. Other sequences of steps may also be performed according to alternative embodiments. For example, alternative embodiments of the present invention may perform the steps outlined above in a different order. Moreover, the individual steps illustrated in FIGS. 8, 9, 10, 11, and 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 13:
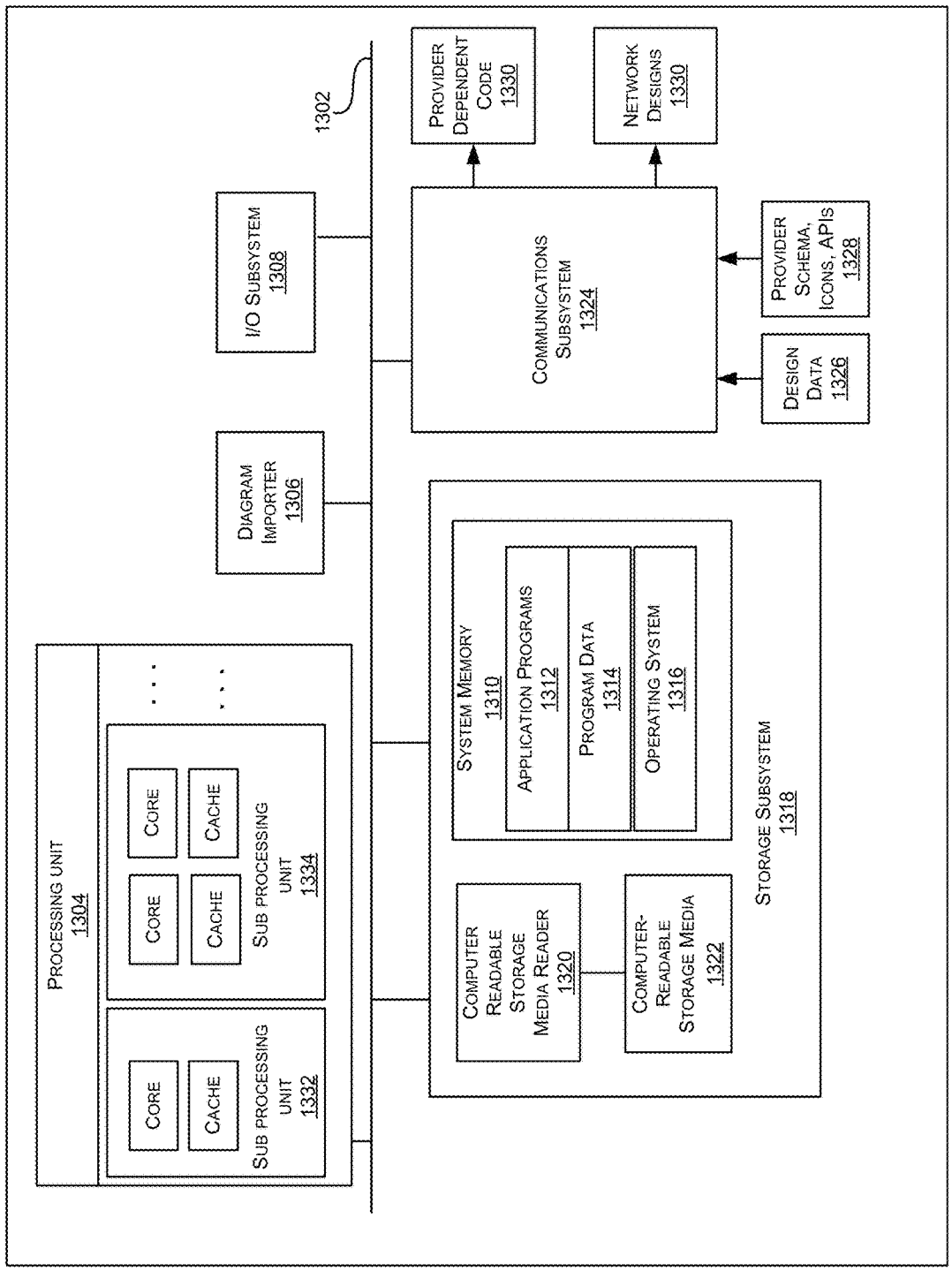
FIG. 13 illustrates an exemplary system diagram for intelligent network design.

Each of the embodiments disclosed herein may be implemented in a special-purpose computer system. FIG. 13 illustrates a computer system 1300, in which various embodiments described herein may be implemented. The system 1300 may be used to implement any of the techniques described above. As shown in the figure, computer system 1300 includes a processing unit 1304 that communicates with a number of peripheral subsystems via a bus subsystem 1302. These peripheral subsystems may include a diagram importer 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or sub processing unit 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above.

Input/Output (I/O) subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. The I/O subsystem 1308 can include the digital design surface 105, shown in FIG. 1. The User interface input devices may include, for example, motion sensing and/or gesture recognition devices that enables users to control and interact with an input device through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader 3-D scanners, 3-D printers, laser rangefinders, and eye gaze monitoring devices. Additionally, user interface input devices may include, for example, medical imaging input devices such as computed tomography, magnetic resonance imaging, position emission tomography, and medical ultrasonography devices. User interface input devices may also include, for example, audio input devices such as musical instrument digital interface (MIDI) keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a light emitting diode (LED) display, a thin-film transistor liquid-crystal display (TFT LCD) panels, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

The diagram importer 1306 can include a digital scanner, a smartboard, or a digital camera. A basic network design can be drafted on a surface (e.g., a whiteboard). A digital image of the basic network design can be captured by a digital camera. Alternatively, a basic network design can be drafted on a smartboard. The smartboard can include one or more magnetic markers that indicate various network components. The smartboard can recognize the markers on the smartboard and the one or more network component lines. Finally, a basic network design can be generated by one or more design tools (e.g., Microsoft Visio). The basic network design can be scanned using an image scanner and imported into the system 1300.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including, without limitation, the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present invention.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact-disc read only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

The storage subsystem 1318 can include the one or more databases previously described. The storage subsystem 1318 can include the design storage database 107, as shown in FIG. 1, the component inventory database 112, as shown in FIG. 1, the image storage database 206, as shown in FIG. 2, the model storage database 210, as shown in FIG. 2, the design database 305, as shown in FIG. 3, and the model database 309, as shown in FIG. 3.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments, communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third-party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software. Information and instructions transferred between different elements described herein may be transmitted via one or more electronic signals.

The invention claimed is:

1. A computer-implemented method for designing a system architecture performed by one or more processors, the method comprising:
   receiving an image of a diagram of a base structure of a network;
   extracting a position and a size of a plurality of network components from the diagram;
   generating first code data structure that is independent of a service provider using the position and the size of the plurality of network components;
   storing the first code data structure to a design database;
   calculating a list of two or more network design suggestions comprising network components or configurations by analyzing design data from the first code data structure and one or more previous designs;
   providing the list of network design suggestions to a user on a digital design surface in a ranked order;
   receiving a selection of a network design from the list of network design suggestions and a specific service provider; and
   generating second code that is operational for the specific service provider for the selected network design.

2. The method of claim 1, further comprising:
   storing one or more additional network designs to the design database; and
   analyzing the one or more additional stored network designs to inform the list of network design suggestions.

3. The method of claim 2, wherein the one or more network designs are user-generated.

4. The method of claim 1, wherein extracting the position and the size of the plurality of network components comprises:
   preprocessing the image of the diagram of the base structure of the network;
   detecting one or more network architecture objects in the image;
   labelling the one or more architecture objects in the image creating an improved network model; and
   generating the first code data structure based on the improved network model.

5. The method of claim 4, further comprising:
   storing the improved network model to a database; and
   analyzing the improved network model to train an object detector.

6. The method of claim 4, further comprising providing a suggested label for the one or more architecture objects to the user.

7. The method of claim 1, further comprising:
   importing static design data from one or more public sources via a network; and
   storing the static design data to the design database.

8. The method of claim 7, further comprising:
   simulating a plurality of network models using a design assistance model trainer using the stored static design data as translated using the first code data structure;
   extracting one or more features of the plurality of network models; and
   scoring the plurality of network models to select a recommended model.

9. The method of claim 1, further comprising scanning the image of the diagram of the base structure of the network using a scanner.

10. The method of claim 1, wherein extracting a position and a size of a plurality of network components comprises recognizing one or more magnetic markers identifying network components.

11. The method of claim 1, wherein extracting a position and a size of a plurality of network components comprises employing computer vision techniques to perform the extraction.

12. The method of claim 1, further comprising preprocessing the image.

13. The method of claim 1, further comprising:
   detecting one or more network architecture objects in the image; and
   labelling the one or more architecture objects in the image thereby creating an improved network model.

14. The method of claim 13, wherein the labelling is automatically performed based on said detecting.

15. A non-transitory, computer-readable medium comprising instructions that, when executed by one or more processors, cause the one or more processors to perform operations comprising:
   receiving an image of a diagram of a base structure of a network;
   extracting a position and a size of a plurality of network components from the diagram;
   generating a first code data structure that is independent of a service provider using the position and the size of the plurality of network components;
   storing the first code data structure to a design database;
   calculating a list of two or more network design suggestions comprising network components or configurations by analyzing design data from the first code data structure and one or more previous designs;
   providing the list of network design suggestions to a user on a digital design surface in a ranked order;
   receiving a selection of a network design from the list of network design suggestions and a specific service provider; and
   generating a second code that is operational for a specific service provider for the selected network design.

16. An intelligent network generation system comprising:
   one or more processors; and
   one or more memory devices comprising instructions that, when executed by the one or more processors, cause the one or more processors to perform operations comprising:
   receiving an image of a diagram of a base structure of a network;
   extracting a position and a size of a plurality of network components from the diagram;
   generating a first code data structure that is independent of a service provider using the position and the size of the plurality of network components;
   storing the first code data structure to a design database;
   calculating a list of two or more network design suggestions comprising network components or configurations by analyzing design data from the first code data structure and one or more previous designs;
   providing the list of network design suggestions to a user on a digital design surface in a ranked order;
   receiving a selection of a network design from the list of network design suggestions and a specific service provider; and
   generating a second code data structure that is operational for a specific service provider for the selected network design.

17. The intelligent network generation system of claim 16, further comprising instructions that when executed by the one or more processors, cause the one or more processors to perform operations comprising:
   storing one or more additional network designs to the design database; and
   analyzing the one or more additional stored network designs to inform the list of network design suggestions.

18. The intelligent network generation system of claim 16, wherein extracting the position and the size of the plurality of network components comprises:
   preprocessing the image of the diagram of the base structure of the network;
   detecting one or more network architecture objects in the image;
   labelling the one or more architecture objects in the image creating an improved network model; and
   generating the first code data structure based on the improved network model.

19. The intelligent network generation system of claim 18, further comprising instructions that when executed by the one or more processors, cause the one or more processors to perform operations comprising:
   storing the improved network model to the design database; and
   analyzing the improved network model to train an object detector.

20. The intelligent network generation system of claim 16, further comprising instructions that when executed by the one or more processors, cause the one or more processors to perform operations comprising:
   importing static design data from one or more public sources via a network; and
   store the static design data to the design database.

* * * * *